US012462332B2

(12) United States Patent
Hattori

(10) Patent No.: US 12,462,332 B2
(45) Date of Patent: Nov. 4, 2025

(54) IMAGE PROCESSING APPARATUS, IMAGE PROCESSING METHOD, AND NON-TRANSITORY COMPUTER READABLE MEDIUM FOR PROCESSING IMAGES INCLUDING TWO IMAGE REGIONS

(71) Applicant: CANON KABUSHIKI KAISHA, Tokyo (JP)

(72) Inventor: Wakaki Hattori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 349 days.

(21) Appl. No.: 18/188,510

(22) Filed: Mar. 23, 2023

(65) Prior Publication Data

US 2023/0325969 A1 Oct. 12, 2023

(30) Foreign Application Priority Data

Apr. 6, 2022 (JP) .................................. 2022-063305

(51) Int. Cl.
*G06T 3/047* (2024.01)
*G06T 3/12* (2024.01)
*G06T 3/4007* (2024.01)

(52) U.S. Cl.
CPC ................. *G06T 3/047* (2024.01); *G06T 3/12* (2024.01); *G06T 3/4007* (2013.01)

(58) Field of Classification Search
CPC .......... G06T 3/047; G06T 3/12; G06T 3/4007
See application file for complete search history.

(56) References Cited

U.S. PATENT DOCUMENTS 10,991,068 B2 4/2021 Zhu
2018/0286026 A1* 10/2018 Fan ........................... G06T 5/50

FOREIGN PATENT DOCUMENTS

JP 2020-106932 A 7/2020
WO 2013/046886 A1 4/2013

OTHER PUBLICATIONS

Lo, I-C. et al., "Image Stitching for Dual Fisheye Cameras" 2018 25th IEEE International Conference on Image Processing (ICIP) (Oct. 2018) pp. 3164-3168, XP055516021.
Extended European Search Report issued in corresponding EP Patent Application No. 23160920.7, dated Aug. 4, 2023.

* cited by examiner

*Primary Examiner* — Casey L Kretzer
(74) *Attorney, Agent, or Firm* — Carter, DeLuca & Farrell LLP

(57) ABSTRACT

An image processing apparatus acquires an image in which first and second image regions, each of which is a region of a fisheye image, are arranged, and converts the first and second image regions into third and fourth image regions, each of which is a region of an equidistant cylindrical image, respectively, wherein in the conversion, as interpolation processing to acquire pixel values in an equidistant cylindrical image from a plurality of pixel values in a fisheye image, first interpolation processing is performed on a specific region in the third and fourth image regions, and second interpolation processing, which is simpler than the first interpolation processing, is performed on a region other than the specific region.

13 Claims, 4 Drawing Sheets

IMAGE PROCESSING APPARATUS, IMAGE PROCESSING METHOD, AND NON-TRANSITORY COMPUTER READABLE MEDIUM FOR PROCESSING IMAGES INCLUDING TWO IMAGE REGIONS

BACKGROUND OF THE INVENTION

Field of the Invention

The present invention relates to an image processing apparatus, an image processing method, and a non-transitory computer readable medium.

Description of the Related Art

WO 2013/046886 indicates that two images (an image for a right eye and an image for a left eye) are captured using two image capturing lenses respectively, and these two images are stereoscopically displayed. Japanese Patent Application Publication No. 2020-106932 indicates that a moving image is distributed (live streaming) in real-time.

In general live streaming, images are sequentially distributed at a predetermined frame rate. However, in a case of live streaming for stereoscopic viewing, images for a right eye and images for a left eye have to be provided, which means that processing time (time for preparing an image to be distributed) takes longer than normal live streaming. Therefore it is difficult to distribute the image for the right eye and the image for the left eye in real-time.

SUMMARY OF THE INVENTION

The present invention provides a technique capable of acquiring an image in a predetermined format for stereoscopic viewing in a short time with good image quality.

An image processing apparatus according to the present invention includes: a processor; and a memory storing a program which, when executed by the processor, causes the image processing apparatus to acquire an image in which a first image region and a second image region, each of which is a region of a fisheye image, are arranged, and convert the first image region and the second image region into a third image region and a fourth image region, each of which is a region of an equidistant cylindrical image, respectively, wherein in the conversion, each position in the first image region and each position in the third image region are corresponded, a correspondence relationship between each position in the second image region and each position in the fourth image region is determined based on a correspondence relationship between each position in the first image region and each position in the third image region, and as interpolation processing to acquire pixel values in an equidistant cylindrical image from a plurality of pixel values in a fisheye image, first interpolation processing is performed on a first partial region in the third image region and a second partial region in the fourth image region, and second interpolation processing, which is simpler than the first interpolation processing, is performed on a third partial region in the third image region and a fourth partial region in the fourth image region.

Further features of the present invention will become apparent from the following description of exemplary embodiments with reference to the attached drawings.

DESCRIPTION OF THE EMBODIMENTS

Figure 1:
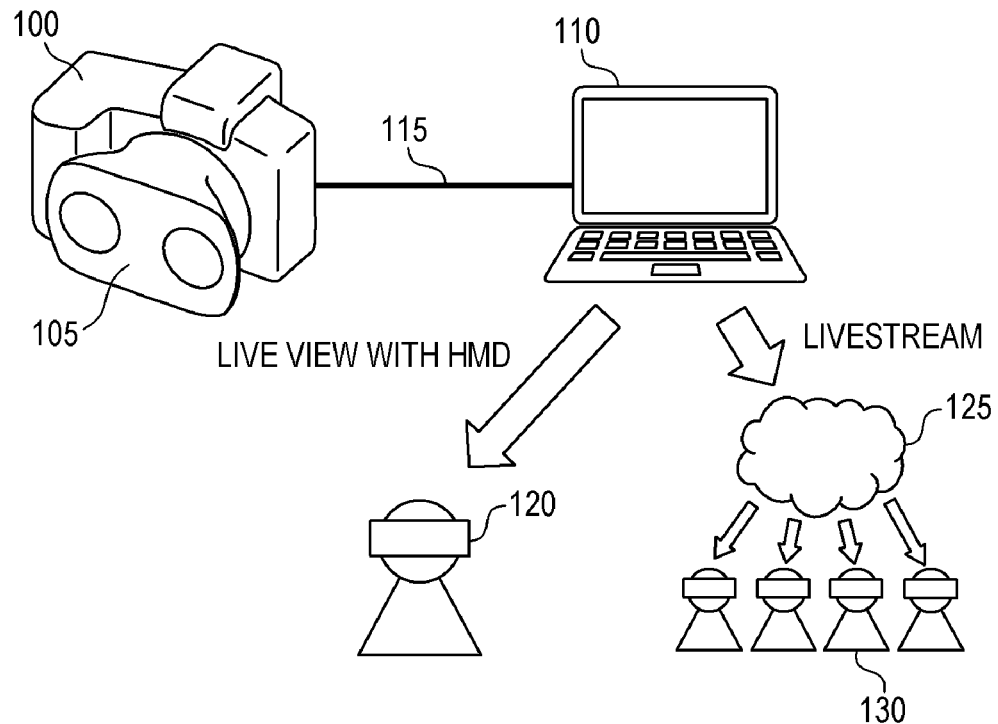
FIG. 1 is a schematic diagram depicting an example of a general configuration of a system.

Embodiments of the present invention will now be described. FIG. 1 is a schematic diagram depicting an example of a general configuration of a system according to the present embodiment. The system according to the present embodiment includes a digital camera (camera) 100 and a personal computer (PC) 110.

A dual-lens unit 105 is installed in (connected to) the camera 100. By installing the dual-lens unit 105, the camera 100 can capture one image (still image or moving image) that includes two image regions having a predetermined parallax. The dual-lens unit 105 is a VR 180 lens unit that acquires a VR 180 image, which is one format of a virtual reality (VR) image capable of binocular stereoscopic viewing.

The PC 110 is an information processing apparatus that handles images captured by an imaging apparatus (e.g. camera 100). FIG. 1 indicates a configuration where the camera 100 and the PC 110 are communicably interconnected via a high definition multimedia interface (HDMI®) cable 115. The camera 100 and the PC 110 may be communicably interconnected via a different kind of cable (e.g. universal serial bus (USB) cable) or communicably interconnected wirelessly.

The PC 110 receives signals (video signals, image signals) of images, which are captured by the camera 100 from the camera 100, and converts the signals into a streamable format, whereby the signals can be distributed to each apparatus of a plurality of users 130 respectively via a cloud 125. The PC 110 can also directly send the received video signals to such a display device as a head mounted display (HMD) 120. The PC 110 is connected to the HMD 120 or the Internet (including cloud 125 and apparatus of the user 130) via a cable or wirelessly.

Figure 2:
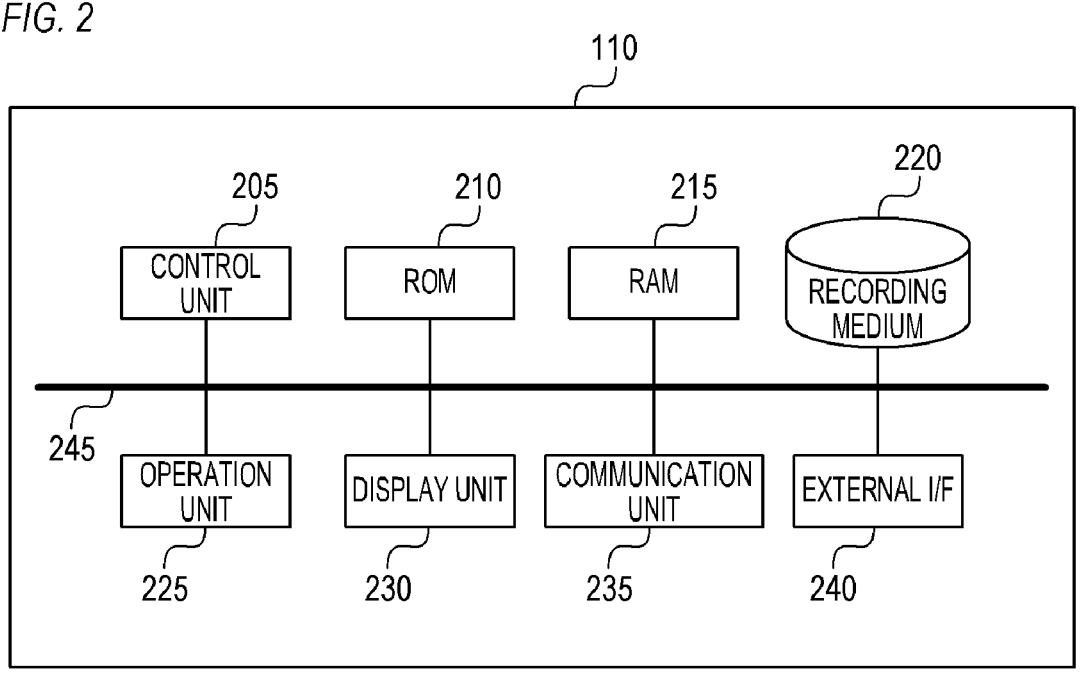
FIG. 2 is a block diagram depicting an example of a configuration of a PC.

FIG. 2 is a block diagram depicting an example of the configuration of the PC 110. A control unit 205 is a central processing unit (CPU), for example, and controls the entire PC 110. A read only memory (ROM) 210 stores programs and parameters non-temporarily. A random access memory (RAM) 215 temporarily stores programs and data supplied from an external device or the like. A recording medium 220 is a hard disk or flash memory that is fixed to the PC 110, or an optical card, an IC card, a memory card, or the like that is detachable from the PC 110. An operation unit 225 accepts operations performed by the user on the PC 110. The operation member that the user used for the operation may be buttons, a touch panel, or the like arranged on the PC 110, or may be a keyboard, a mouse or the like that is detachable from the PC 110. A display unit 230 displays data held by the PC 110, data supplied from the outside, and the like. The display unit 230 may be a part of the PC 110, or may be a display device that is separate from the PC 110. The PC 110 can display a video (images), based on the video signals from the camera 100, on the display unit 230. A communication unit 235 can be used for communication with the outside. For example, the PC 110 sends (distributes) video signals from the communication unit 235 to the HMD 120 or the cloud 125. An external I/F 240 can also be used for communication with the outside. For example, the PC 110 receives video signals from the camera 100 via the external I/F 240. A system bus 245 connects composing elements of the PC 110 so as to be intercommunicable.

Figure 3:
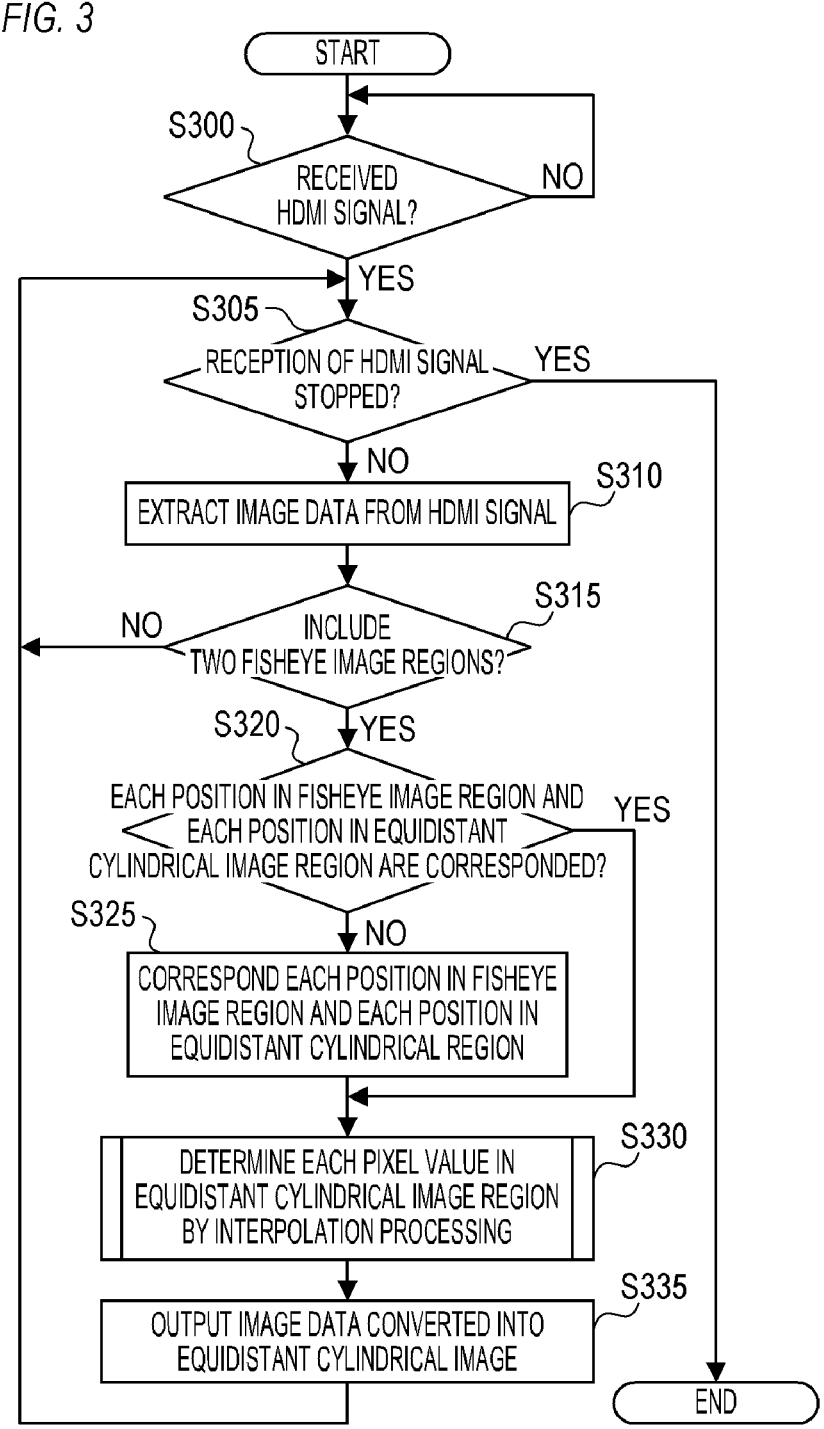
FIG. 3 is a flow chart depicting an example of an operation of the PC.

FIG. 3 is a flow chart depicting an example of the operation of the PC 110. This operation is implemented by the control unit 205 developing a program (application program), which is stored in the ROM 210, in the RAM 215, and executing it. For example, the operation in FIG. 3 starts when the user instructs the PC 110 to startup a specified application. The operation in FIG. 3 is an operation to distribute (live stream) a moving image taken (captured) by the camera 100 in real-time.

In step S300, the control unit 205 determines whether or not an HDMI signal is received from the outside. The control unit 205 waits for reception of the HDMI signal, and advances processing to step S305 if the HDMI® signal is received.

In step S305, the control unit 205 determines whether or not the reception of the HDMI signal from the outside is stopped. The control unit 205 ends the operation in FIG. 3 if the reception of the HDMI signal is stopped, or advances processing to step S310 if not.

In step S310, the control unit 205 extracts image data (image signal) from the received HDMI signal.

In step S315, the control unit 205 determines whether or not the image extracted in step S310 (image expressed by the extracted image data) includes two fisheye image regions (image regions of circumferential fisheye images). This determination can be regarded as determining whether or not the extracted images is an image captured by the camera 100 in which the dual-lens unit 105 is installed. Processing advances to S320 if the extracted image includes two fisheye image regions, that is, if the extracted image is an image captured by the camera 100 in which the dual-lens unit 105 is installed, or advances to step S305 if not. In an image 400 in FIG. 4, a fisheye image region 410 and a fisheye image region 420 are arranged side by side. Processing advances to step S320 if the image 400 is extracted (acquired).

In step S315, the control unit 205 converts the extracted image into a monochrome binary image by, for example, converting a value of a pixel, of which brightness value is a threshold or less, into a black pixel value, and converting a value of a pixel, of which brightness value is more than the threshold, into a white pixel value. Then the control unit 205 determines whether or not the binary image includes two circular white regions, so as to determine whether or not the extracted image includes two fisheye image regions. For example, the control unit 205 selects a plurality of pairs of two points (a first point and a second point that is most distant from the first point) on the outer periphery of the white region, and sets a line connecting the two points for each pair. Then the control unit 205 determines whether or not the shape of the white region is a circle by determining whether or not the plurality of lines that were set above cross at one point. Considering errors, it may be determined that the shape of the white region is a circle even if there are two or more intersecting points of the plurality of lines, as long as all the intersecting points are within a predetermined range. As a condition to determine that the extracted image includes two fisheye image region, not only a condition that the binary image includes two circular white regions, but also a condition that the size (number of pixels) of each of the two white regions is similar, may be used as well.

In the present embodiment, each of the two fisheye image regions is converted into equidistant cylindrical image regions (regions of equidistant cylindrical images (images in the equidistant cylindrical projection format)) for stereoscopic viewing. In step S320, for each of the two fisheye image regions, the control unit 205 determines whether or not each position (coordinates) in the fisheye image region and each position (coordinates) in the equidistant cylindrical image region are corresponded. Processing advances to step S330 if corresponded, or to step S325 if not.

In step S325, for each of the two fisheye image regions, the control unit 205 corresponds each position in the fisheye image region and each position in the equidistant cylindrical image region. For a first fisheye image region, the control unit 205 corresponds the positions using template matching or a method considering lens information (e.g. individual value of the optical system) on the optical system (e.g. image capturing lens) used for imaging this fisheye image region, for example. For a second fisheye image region, the control unit 205 determines the correspondence based on the correspondence acquired for the first fisheye image region (correspondence between each position in the fisheye image region and each position in the equidistant cylindrical image region). Thereby processing time can be decreased compared with the case of corresponding the positions for each of the two fisheye image regions respectively.

Figure 4:
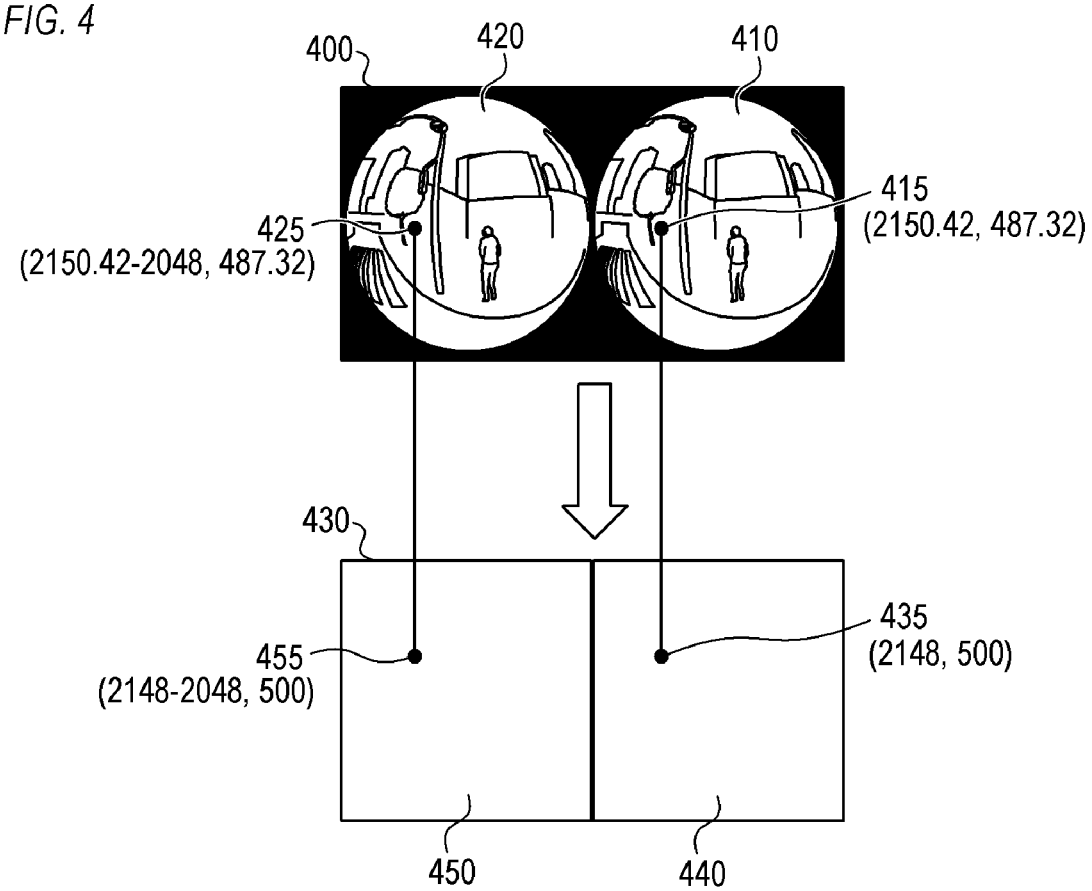
FIG. 4 is a schematic diagram depicting an example of correspondence between fisheye image regions and equidistant cylindrical image regions.

A specific example of the processing in step S325 will be described with reference to FIG. 4. The image size is not especially limited, and in the case of FIG. 4, the image 400 extracted from the HDMI signal has an image size of a number of pixels in the horizontal direction×a number of pixel in the vertical direction=4096×2160. In the image 400, the fisheye image region 410, which was captured using the right lens (optical system to capture images from the right side), is arranged on the right, and the fisheye image region 420, which was captured using the left lens (optical system to capture images from the left side), is arranged on the left. In FIG. 4, it is assumed that the image 400 (4096×2160 pixels) is converted into the image 430 (4096×2048 pixels). In the image 430, the equidistant cylindrical image region 440 corresponding to the fisheye image region 410 is arranged on the right side, and the equidistant cylindrical image region 450 corresponding to the fisheye image region 420 is arranged on the left side. The image size of the fisheye image region 410 and the image size of the fisheye image region 420 are the same, and the image size of the equidistant cylindrical image region 440 and the image size of the equidistant cylindrical image region 450 are the same. The positions where the fisheye image regions 410 and 420 are arranged are not especially limited, and, for example, the fisheye image region 410, imaged using the right lens, may be arranged on the left side, and the fisheye image region 420, imaged using the left lens, may be displayed on the right side. Similarly, the positions where the equidistant cylindrical image regions 440 and 450 are arranged are not especially limited.

First the control unit 205 corresponds each position in the fisheye image region 410 on the right side and each position in the equidistant cylindrical image region 440. For example, for each pixel generation position (position where a pixel is generated) in the equidistant cylindrical image region 440, the control unit 205 determines a position in the fisheye image region 410 corresponding to each pixel generation position. For this processing, template matching, a method considering lens information, or the like, is used, as mentioned above. The position in the fisheye image region 410 corresponding to the pixel generation position in the equidistant cylindrical image region 440 becomes a reference position to select a plurality of pixel values in the interpolation processing for acquiring pixel values in the equidistant cylindrical image region from a plurality of pixel values in the fisheye image. In FIG. 4, a pixel generation position 445 (coordinates (horizontal position, vertical position)=(2148, 500)) in the equidistant cylindrical image region 440 corresponds to a position 415 (coordinates (2150.42, 487.32)) in the fisheye image region 410. In this case, the pixel value at the pixel generation position 445 is calculated from a plurality of pixel values around the position 415.

Then the control unit 205 corresponds each position in the fisheye image region 420 on the left side and each position in the equidistant cylindrical image region 450. This processing is performed using the corresponding relationship (result of correspondence) between each position in the fisheye image region 410 and each position in the equidistant cylindrical image region 440. In the image sizes and positions of the fisheye image regions 410 and 420 and the equidistant cylindrical image regions 440 and 450 are knowns, the correspondence relationship between each position in the fisheye image region 420 and each position in the equidistant cylindrical image region 450 can be easily determined based on the result of the above correspondence. In the case of the example in FIG. 4, the correspondence relationship between each position in the fisheye image region 420 and each position in the equidistant cylindrical image region 450 can be acquired by shifting each position in the fisheye image region 410, and each position in the equidistant cylindrical image region 440 by a distance that is half the horizontal widths of the images 400 and 430 respectively. For example, from the correspondence relationship between the position 415 in the fisheye image region 410 and the pixel generation position 445 in the equidistant cylindrical image region 440, the correspondence relationship between a position 425 (coordinates (2148−2048, 500)=(100, 500)) in the fisheye image region 420, and the pixel generation position 445 (coordinates (2150.42−2048, 487.32)=(102.42, 487.32)) in the equidistant cylindrical image region 450 can be easily determined. By utilizing the correspondence relationship between each position in the fisheye image region 410 and each position in the equidistant cylindrical image region 440 like this, the processing time required to correspond each position in the fisheye image region 420 on the left side and each position in the equidistant cylindrical image region 450 can be decreased.

Figure 6:
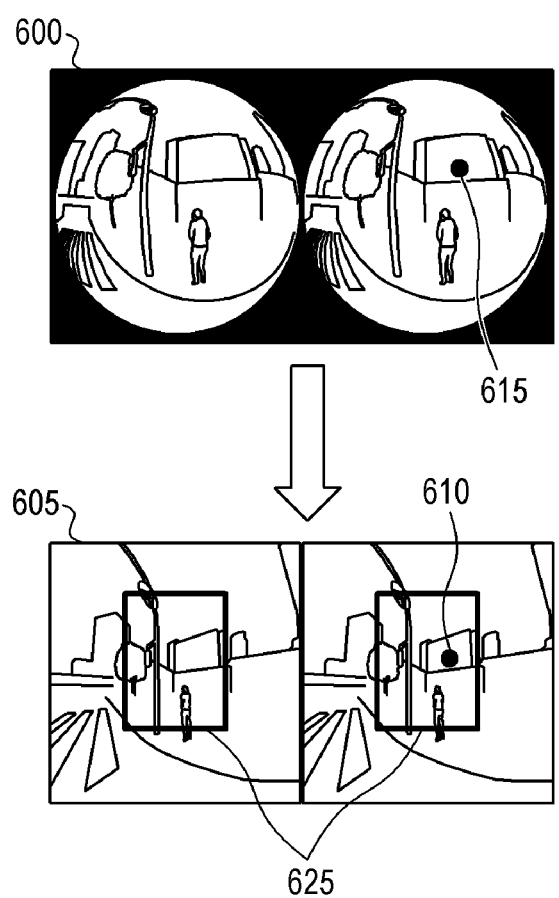
FIG. 6 is a schematic diagram depicting an example of interpolation processing.

In step S330, for each of the two fisheye image regions, the control unit 205 performs interpolation processing to acquire pixel values in the equidistant cylindrical image regions from a plurality of pixel values in the fisheye image. The processing in step S330 will be described in detail later. In the case where an image 600 in FIG. 6 is extracted (acquired) in step S310, an image 605 is acquired by determining each pixel value of the two equidistant cylindrical image regions by interpolation processing (the image 600 is converted into the image 605).

In step S335, the control unit 205 outputs the image data converted into an equidistant cylindrical image (data on the image acquired in step S330 (image in which the two equidistant cylindrical image regions are arranged side by side)) to the outside (e.g. HMD 120, cloud 125) via the communication unit 235.

Figure 5:
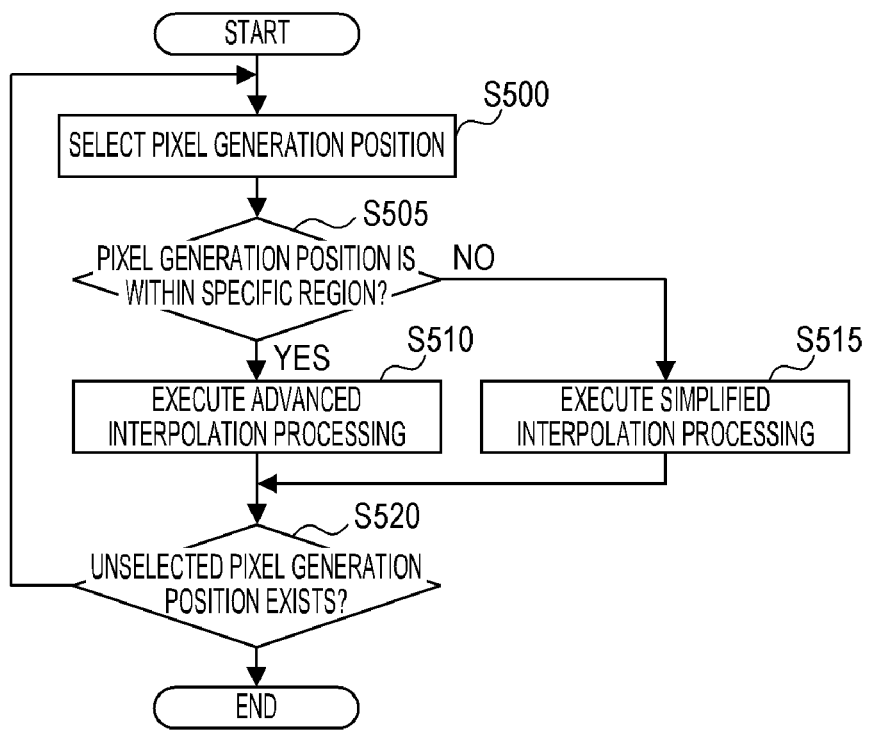
FIG. 5 is a flow chart depicting details on the processing in step S330 in FIG. 3.

FIG. 5 is a flow chart depicting details on the processing in step S330 in FIG. 3. As mentioned above, in step S330, the control unit 205 performs the interpolation processing to acquire the pixel values in the equidistant cylindrical image region from a plurality of pixel values in the fisheye image, for each of the two fisheye image regions.

In step S500, the control unit 205 selects a pixel generation position in the equidistant cylindrical image region. For example, the control unit 205 selects a pixel generation position 610 in FIG. 6.

In step S505, the control unit 205 determines whether or not the pixel generation position selected in step S500 is within a specific region. Processing advances to step S510 if the pixel generation position is within the specific region, or to step S515 if not.

The specific region is a part (partial region) of the equidistant cylindrical image region, and is a region for which advanced interpolation processing is required, as the interpolation processing to acquire the pixel values in the equidistant cylindrical image region from a plurality of pixel values in the fisheye image. A region (a prat of the equidistant cylindrical image region), which is initially displayed on the HMD 120 in a state where the user wearing the HMD 120 is facing the front, is more likely a critical region (region in which an object of interest is captured), which the user mainly views. The rest of the equidistant cylindrical image region is a region which the user cannot view unless their head is turned away from the state of facing the front. The region, which is initially displayed on the HMD 120 in the state where the user wearing the HMD 120 is facing the front, is normally a region at the center portion (region 625 in FIG. 6) of the equidistant cylindrical image region. Therefore based on the correspondence relationship between the orientation of the HMD 120 and the region displayed on the HMD 120, out of the equidistant cylindrical image region, the region at the center portion (region 625 in FIG. 6) of the equidistant cylindrical image region is used as the specific region. In the case where the pixel generation position 610 is selected in step S500, processing advances to step S510 since the pixel generation position 610 is in the specific region 625.

In step S510, the control unit 205 performs the advanced interpolation processing, as the interpolation processing to acquire the pixel values in the equidistant cylindrical image region from a plurality of pixel values in the fisheye image, and determines the pixel value of the pixel generation position selected in step S500. The advanced interpolation processing is the interpolation processing based on the bicubic method, for example.

In step S515, the control unit 205 performs the interpolation processing, which is simpler than the interpolation processing in step S510, as the interpolation processing to acquire the pixel values in the equidistant cylindrical image region from a plurality of pixel values in the fisheye image, and determines the pixel value of the pixel generation position selected in step S500. The simplified interpolation processing is the interpolation processing based on the nearest-neighbor method, for example.

The time required for the simplified interpolation processing, based on the nearest-neighbor method or the like, is shorter than the time required for the advanced interpolation processing based on the bicubic method or the like. As mentioned above, in the present embodiment, the advanced interpolation processing is performed for the specific region (a part of the equidistant cylindrical image region) for which advanced interpolation processing is required, and the simplified interpolation processing is performed for the region (a part of the equidistant cylindrical image region) other than the specific region. Thereby the processing time until the completion of the interpolation processing can be decreased, while suppressing deterioration of the image quality in the specific region.

In the case where the pixel generation position 610 was selected in step S500 and a position 615 is corresponded with the pixel generation position 610, the pixel value of the pixel generation position 610 is calculated from a plurality of pixel values around the position 615 in step S510 or step S515. If a pixel exists at the position 615, the pixel value of the position 615 may be determined (used) as the pixel value of the pixel generation position 610 without performing the interpolation processing.

In step S520, the control unit 205 determines whether or not an unselected pixel generation position exists in the two equidistant cylindrical image regions. Processing advances to step S500 if an unselected pixel generation position exists, or processing in FIG. 5 ends if not (if the interpolation processing is completed and pixel values of all the pixel generation positions have been determined).

As described above, according to the present embodiment, each position in the fisheye image region and each position in the equidistant cylindrical image region are corresponded in a normal method for a first fisheye image region. For a second fisheye image region, the correspondence relationship is determined based on the correspondence relationship acquired for the first fisheye image region (correspondence relationship between each position in the fisheye image region and each position in the equidistant cylindrical image region). Further, the advanced interpolation processing is performed for a specific region (a part of the equidistant cylindrical image region) for which advanced interpolation processing is required, and the simplified interpolation processing is performed for the region other than the specific region (a part of the equidistant cylindrical image region). Thereby an image in a predetermined format for stereoscopic viewing (image where two equidistant cylindrical image regions are arranged side by side) can be acquired in a short time with good image quality (image quality where deterioration of the image quality in the specific region has been suppressed).

In the present embodiment, the interpolation processing is changed among a plurality of regions based on the correspondence relationship between the orientation of the display device and the region of the equidistant cylindrical image region displayed on the display device. Specifically, the advanced interpolation processing is performed for the region at the center portion of the equidistant cylindrical image region, and a simplified interpolation processing is performed for the region outside the region at the center portion of the equidistant cylindrical image region. However the plurality of regions among which the interpolation processing is changed are not limited thereto.

For example, the plurality of region, among which the interpolation processing is changed, may be determined based on the lens information.

The plurality of regions, among which the interpolation processing is changed, may be determined based on the distance between each position in the equidistant cylindrical image region, and a position corresponding to the optical axis of the optical system (e.g. image capturing lens) used for imaging this equidistant cylindrical image region. In the equidistant cylindrical image region, a region close to the position corresponding to the optical axis is an area where the object of interest is captured, and where advanced interpolation processing is likely to be required. Further, the position corresponding to the optical axis is normally a center position of the equidistant cylindrical image region. Hence even in the case where the plurality of regions are determined, based on the distance between each position in the equidistant cylindrical image region and the position corresponding to the optical axis, the advanced interpolation processing may be performed for the region at the center portion of the equidistant cylindrical image region, and the simplified interpolation processing may be performed for the region outside the region at the center portion. Furthermore, the advanced interpolation processing may be performed for a region of which distance from the position corresponding to the optical axis is less than a threshold, and a simplified interpolation processing may be performed for a region of which distance from the position corresponding to the optical axis is the threshold or more.

In the equidistant cylindrical image region, a region that is distant from the position corresponding to the optical axis is an area where distortion of the image is large and where advanced interpolation processing is likely to be required. Hence in the case where the plurality of regions are determined based on the distance between each position in the equidistant cylindrical image region and the position corresponding to the optical axis, the advanced interpolation processing may be performed for the region outside the region at the center portion of the equidistant cylindrical image region, and the simplified interpolation processing may be performed for the region at the center portion. Furthermore, the advanced interpolation processing may be performed for a region of which distance from the position corresponding to the optical axis is a threshold or more, and the simplified interpolation processing may be performed for a region of which distance from the position corresponding to the optical axis is less than the threshold.

The plurality of regions, among which the interpolation processing is changed, may also be determined based on a degree of distortion of the image at each position in the equidistant cylindrical image region. In the case where the determination is based on the degree of distortion of the image at each position in the equidistant cylindrical image region, the advanced interpolation processing may be performed for a region outside of the region at the center portion of the equidistant cylindrical image region, and the simplified interpolation processing may be performed for the region at the center portion. Furthermore, the advanced interpolation processing may be performed for a region of which distance from the position corresponding to the optical axis is a threshold or more, and the simplified interpolation processing may be performed for a region of which distance from the position corresponding to the optical axis is less than the threshold.

Moreover, the plurality of regions among which the interpolation processing is changed, may be determined based on the conversion information, such as the correspondence relationship between each position in the fisheye image region and each position in the equidistant cylindrical image region. Further, the plurality of regions, among which the interpolation processing is changed, may be determined based on the distance between each position in the equidistant cylindrical image region and each position in the fisheye image region corresponding to each position in this equidistant cylindrical image region. In a region where the position largely changes before and after the conversion from the fisheye image region to the equidistant cylindrical image region, the advanced interpolation processing is likely to be required. Hence the advanced interpolation processing may be performed for a region in which distance between the position in the equidistant cylindrical image region and the position in the fisheye image region corresponding to the position in this equidistant cylindrical image region is a threshold or more, and the simplified interpolation processing may be performed for a region in which this distance is less than the threshold.

In the present embodiment, the bicubic method is used as the advanced interpolation processing, and the nearest-neighbor method is used for the simplified interpolation processing, but the present invention is not limited thereto. For example, the bicubic method may be used for the advanced interpolation processing, the bilinear method may be used for the simplified interpolation processing. Further, the bilinear method may be used for the advanced interpolation processing, and the nearest-neighbor method may be used for the simplified interpolation processing.

In the present embodiment, the method (type, algorithm) of the interpolation processing is changed, but the present invention is not limited thereto. For example, a number of pixels in the fisheye image region, that is referred to in the interpolation processing (size of the range that is referred to in the interpolation processing in the fisheye image region), may be changed. In the case of using the bicubic method, 36 pixels around the reference position (position in the fisheye image region corresponding to the pixel generation position in the equidistant cylindrical image region) may be referred to in the advanced interpolation processing, and nine pixels around the reference position may be referred to in the simplified interpolation processing.

Further, in the present embodiment, the interpolation processing is changed between two partial regions in the equidistant cylindrical image region, but the interpolation processing may be changed (differentiated) among three or more partial regions. For example, a more advanced interpolation processing may be performed as the partial region is closer to the center of the equidistant cylindrical image region. The bicubic method may be used for a region that is close to the center of the equidistant cylindrical image region; the near-neighbor method may be used for a region that is distant from the center of the equidistant cylindrical image region; and the bilinear method may be used for regions located between these regions.

Various controls mentioned above are performed by the control unit 205, and may be performed by one hardware unit, or may be shared by a plurality of hardware units (e.g. a plurality of processors and circuits) so as to control the entire apparatus.

Whereas the embodiments of the present invention have been described, the present invention is not limited to these specific embodiments, but include various modes within a scope not departing from the spirit of the invention. Each embodiment described above is merely an embodiment of the present invention, and may be combined when necessary.

The present invention may be applied not only to a PC, but also to any electronic apparatus that can execute image processing (image processing apparatus). For example, the present invention can be applied to a camera, a PDA, a portable telephone, a portable type image viewer, a printer, a digital photo frame, a music player, a game machine, an electronic book reader, and the like. The present invention may also be applied to a video player, a display device (including a projection device), a tablet terminal, a smartphone, an AI speaker, a home electronic device, an on-vehicle device, and the like.

According to the present invention, an image in a predetermined format for stereoscopic viewing can be acquired in a short time with good image quality.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-063305, filed on Apr. 6, 2022, which is hereby incorporated by reference herein in its entirety.

What is claimed is:

1. An image processing apparatus comprising:
a processor; and
a memory storing a program which, when executed by the processor, causes the image processing apparatus to:
acquire an image in which a first image region and a second image region, each of which is a region of a fisheye image, are arranged; and
perform a conversion processing to convert the first image region and the second image region into a third image region and a fourth image region, each of which is a region of an equidistant cylindrical image, respectively, wherein:
in the conversion processing, a first correspondence relationship between each position in the first image region and each position in the third image region is determined,
in the conversion processing, a second correspondence relationship between each position in the second image region and each position in the fourth image region is determined based on the first correspondence relationship, and in the conversion processing, an interpolation processing is performed to acquire pixel values in an equidistant cylindrical image based on a plurality of pixel values in the fisheye image, first interpolation processing is performed on a first partial region in the third image region and a second partial region in the fourth image region, and second interpolation processing, which is simpler than the first interpolation processing, is performed on a third partial region in the third image region and a fourth partial region in the fourth image region, wherein the third partial region is different from the first partial region, and the fourth partial region is different from the second partial region.

2. The image processing apparatus according to claim 1, wherein
the first partial region and the third partial region are regions based on:
a correspondence relationship between an orientation of a display device and a region displayed by the display device, out of the third image region;
a distance between each position in the third image region and a position corresponding to an optical axis of an optical system used for imaging the third image region;
a degree of distortion of an image at each position in the third image region; or
a distance between each position in the third image region and each position in the first image region corresponding to each position in the third image region, and
the second partial region and the fourth partial region are regions based on:
a correspondence relationship between an orientation of the display device and a region displayed by the display device, out of the fourth image region;
a distance between each position in the fourth image region and a position corresponding to an optical axis of an optical system used for imaging the fourth image region;
a degree of distortion of an image at each position in the fourth image region; or
a distance between each position in the fourth image region and each position in the first image region corresponding to each position in the fourth image region.

3. The image processing apparatus according to claim 1, wherein
the first partial region is a region at a center portion of the third image region,
the third partial region is a region, which is outside the first partial region, out of the third image region,
the second partial region is a region at a center portion of the fourth image region, and
the fourth partial region is a region, which is outside the second partial region, out of the fourth image region.

4. The image processing apparatus according to claim 1, wherein
the third partial region is a region at a center portion of the third image region,
the first partial region is a region, which is outside the third partial region, out of the third image region,
the fourth partial region is a region at a center portion of the fourth image region, and
the second partial region is a region, which is outside the fourth partial region, out of the fourth image region.

5. The image processing apparatus according to claim 1, wherein the first interpolation processing is interpolation processing using a bicubic method, and
the second interpolation processing is interpolation processing using a nearest-neighbor method.

6. The image processing apparatus according to claim 1, wherein
the first interpolation processing is interpolation processing using a bicubic method, and
the second interpolation processing is interpolation processing using a bilinear method.

7. The image processing apparatus according to claim 1, wherein
the first interpolation processing is interpolation processing using a bilinear method, and
the second interpolation processing is interpolation processing using a nearest-neighbor method.

8. The image processing apparatus according to claim 1, wherein
a number of pixels of the fisheye image to be referred in the second interpolation processing is less than a number of pixels of the fisheye image to be referred in the first interpolation processing.

9. The image processing apparatus according to claim 1, wherein
in the conversion processing, the interpolation processing is differentiated among three or more partial regions, for each of the third image region and the fourth image region.

10. The image processing apparatus according to claim 1, wherein the first correspondence relationship is determined based on lens information.

11. The image processing apparatus according to claim 1, wherein the first correspondence relationship is determined using template matching.

12. An image processing method comprising:
acquiring an image in which a first image region and a second image region, each of which is a region of a fisheye image, are arranged; and
performing conversion processing to convert the first image region and the second image region into a third image region and a fourth image region, each of which is a region of an equidistant cylindrical image, respectively,
wherein in the conversion processing, a first correspondence relationship between each position in the first image region and each position in the third image region is determined,
wherein in the conversion processing, a second correspondence relationship between each position in the second image region and each position in the fourth image region is determined based on the first correspondence relationship, and
wherein in the conversion processing, an interpolation processing is performed to acquire pixel values in an equidistant cylindrical image based on a plurality of pixel values in the fisheye image, first interpolation processing is performed on a first partial region in the third image region and a second partial region in the fourth image region, and second interpolation processing, which is simpler than the first interpolation processing, is performed on a third partial region in the third image region and a fourth partial region in the fourth image region, wherein the third partial region is different from the first partial region, and the fourth partial region is different from the second partial region.

13. A non-transitory computer readable medium that stores a program, wherein the program causes a computer to execute an image processing method comprising:

acquiring an image in which a first image region and a second image region, each of which is a region of a fisheye image, are arranged; and performing conversion processing to convert the first image region and the second image region into a third image region and a fourth image region, each of which is a region of an equidistant cylindrical image, respectively, wherein in the conversion processing, a first correspondence relationship between each position in the first image region and each position in the third image region is determined, wherein in the conversion processing, a second correspondence relationship between each position in the second image region and each position in the fourth image region is determined based on the first correspondence relationship, and wherein in the conversion processing, an interpolation processing is performed to acquire pixel values in an equidistant cylindrical image based on a plurality of pixel values in the fisheye image, first interpolation processing is performed on a first partial region in the third image region and a second partial region in the fourth image region, and second interpolation processing, which is simpler than the first interpolation processing, is performed on a third partial region in the third image region and a fourth partial region in the fourth image region, wherein the third partial region is different from the first partial region, and the fourth partial region is different from the second partial region.

* * * * *